(12) United States Patent
Fukuma

(10) Patent No.: US 11,196,885 B2
(45) Date of Patent: Dec. 7, 2021

(54) IMAGE FORMING APPARATUS

(71) Applicant: KYOCERA Document Solutions Inc., Osaka (JP)

(72) Inventor: Nobuhiro Fukuma, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/201,187

(22) Filed: Mar. 15, 2021

(65) Prior Publication Data

US 2021/0289080 A1 Sep. 16, 2021

(30) Foreign Application Priority Data

Mar. 16, 2020 (JP) .............................. JP2020-045234

(51) Int. Cl.
*H04N 1/00* (2006.01)

(52) U.S. Cl.
CPC ....... *H04N 1/0066* (2013.01); *H04N 1/00551* (2013.01); *H04N 1/00557* (2013.01)

(58) Field of Classification Search
CPC ............. H04N 1/0066; H04N 1/00551; H04N 1/00554; H04N 1/00557; H04N 1/00559
See application file for complete search history.

(56) References Cited

U.S. PATENT DOCUMENTS

2014/0355084 A1* 12/2014 Inada ................. H04N 1/00557
358/498

FOREIGN PATENT DOCUMENTS

JP          2014-235214 A       12/2014

* cited by examiner

*Primary Examiner* — Moustapha Diaby
(74) *Attorney, Agent, or Firm* — Studebaker & Brackett PC

(57) ABSTRACT

An image forming apparatus includes a main unit, a unit coupling part, a document reading unit, and a correction mechanism. The unit coupling part includes a rear side coupling part and a pair of lateral side coupling parts whose rear end portions are coupled to the rear side coupling part. The document reading unit is supported by the unit coupling part in an openable and closable manner. The correction mechanism corrects a position of the pair of lateral side coupling parts with respect to the document reading unit in a facing direction where the lateral side coupling parts face each other, by closing the document reading unit.

6 Claims, 10 Drawing Sheets

IMAGE FORMING APPARATUS

INCORPORATION BY REFERENCE

This application is based on and claims the benefit of priority from Japanese patent application No. 2020-045234 filed on Mar. 16, 2020, which is incorporated by reference in its entirety.

BACKGROUND

The present disclosure relates to an image forming apparatus including a unit coupling part to couple a main unit to a document reading unit.

An image forming apparatus, such as a copying machine, a facsimile and a multifunctional peripheral, include a main unit in which a printing device is housed and an image reading device. The image reading device includes a document reading unit which reads an image of a placed document and a document cover which covers the document on the document reading unit.

It is also known that the document reading unit is coupled to a unit coupling part protruded on the upper portion of the main unit in an openable and closable manner.

The unit coupling part has a rear side coupling portion provided on a rear side of a discharge tray formed on the upper face of the main body and a pair of lateral side coupling portions provided on both lateral sides of the discharge tray formed on the upper face of the main body.

For example, the document reading unit is supported by the upper portion of the unit coupling part with a hinge provided in the rear side coupling portion in an openable and closable manner.

By the way, the rear end portions of the pair of lateral side coupling portions are coupled to the rear side coupling portion and then reinforced. Then, the rear end portions of the pair of lateral side coupling portions are kept in an original suitable position even if the document reading unit is in an opening state.

On the other hand, there are no member to be coupled for reinforcement near the front upper portions of the pair of lateral side coupling portions. Then, in the state where the document reading unit is in the opening state, the front upper portions of the pair of lateral side coupling portions may be displaced inward or outward from the original suitable position.

If the pair of lateral side coupling portions is displaced, the following disadvantages may occur, for example.

One of the disadvantages is that an engaging part and an engaged part which forms a lock mechanism for locking the document reading unit in a closing state may be displaced. In this case, the lock mechanism may not function normally. The engaging part is provided in the lateral side coupling portion and is engaged with the engaged portion provided in the document reading unit.

The other of the disadvantages is that the lateral side faces of the pair of lateral side coupling portions may be displaced from the original position with respect to the lateral side faces of the document reading unit, and deteriorates the appearance of the image forming apparatus.

For example, in a case where the image forming apparatus has an original configuration that the lateral side faces of the lateral side coupling portions are on the same plane as the lateral side faces of the document reading unit, a level difference may occur between the lateral faces of the lateral side coupling portions and the lateral faces of the document reading unit. Such level difference deteriorates the appearance of the image forming apparatus.

SUMMARY

In accordance with an aspect of the present disclosure, an image forming apparatus includes a main unit, a unit coupling part, a document reading unit, and a correction mechanism. The main unit has a discharge tray on which a sheet having an image is stacked, on an upper face. The unit coupling part includes a rear side coupling part protruded on the upper face of the main unit on a rear side of the discharge tray, and a pair of lateral side coupling parts protruded on the upper face of the main unit on lateral sides of the discharge tray and whose rear end portions are coupled to the rear side coupling part. The document reading unit is supported by an upper portion of the unit coupling part with a hinge provided in the rear side coupling part in an openable and closable manner. The correction mechanism corrects a position of the pair of lateral side coupling parts with respect to the document reading unit in a facing direction where the lateral side coupling parts face each other, by closing the document reading unit. The correction mechanism includes a pair of concave parts and a pair of convex parts. The pair of concave parts is provided in one of upper faces of portions close to front end portions of the lateral side coupling parts and a lower face of a portion close to a front end portion of the document reading unit. The pair of convex parts is provided in the other of the upper faces of the portions close to the front end portions of the lateral side coupling parts and the lower face of the portion close to the front end portion of the document reading unit, and fitted into the pair of concave parts when the document reading unit is closed.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
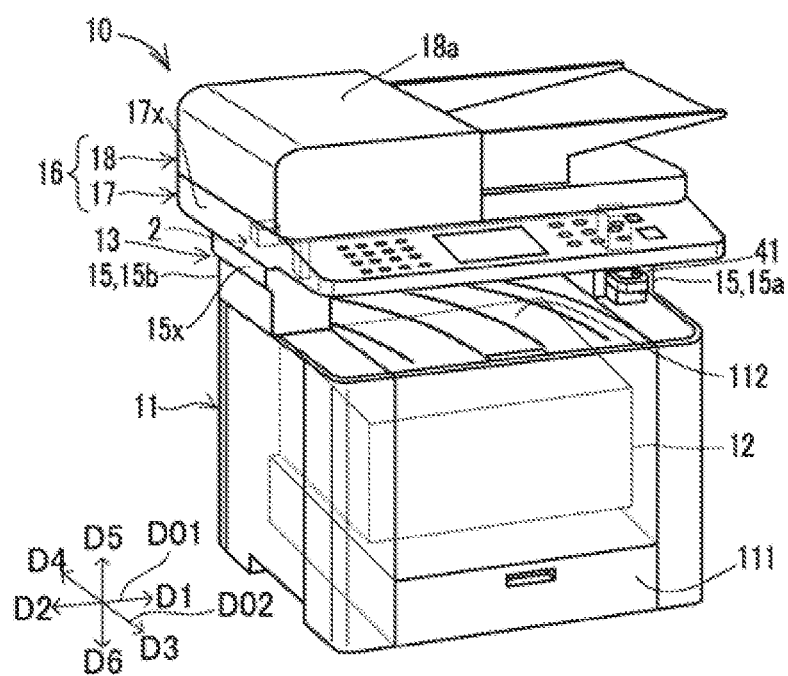
FIG. 1 is a perspective view showing an image forming apparatus according to one embodiment.

Hereinafter, with reference to the attached drawings, one embodiment of the present disclosure will be described. The following embodiment is an embodied example of the present disclosure, and is not limited to the technical scope of the present disclosure.

[Structure of the image forming apparatus 10] The image forming apparatus 10 according to the embodiment is any one of a copying machine, a facsimile, a multifunctional peripheral and the others.

The image forming apparatus 10 includes a main unit 11 in which a printing device 12 is housed, a unit coupling part 13, and an image reading device 16. The printing device 12 conveys a sheet stored in a sheet storage part 111 one by one and forms an image on the sheet.

Further, the printing device 12 discharges the sheet on which the image is formed, on a discharge tray 112. The discharge tray 112 on which the sheet is stacked is formed on the upper face of the main unit 11.

The unit coupling part 13 is coupled to the upper portion of the main unit 11. The unit coupling part 13 contains a rear side coupling part 14 protruded on the upper face of the main unit 11 on the rear side of the discharge tray 112 and a pair of lateral side coupling parts 15 protruded on the upper face of the main unit 11 on the lateral sides of the discharge tray 112.

The lateral side coupling parts 15 face each other in a width direction D01 of the main unit 11. That is, the width direction D01 is a facing direction in which the lateral side coupling parts 15 face each other.

Figure 2:
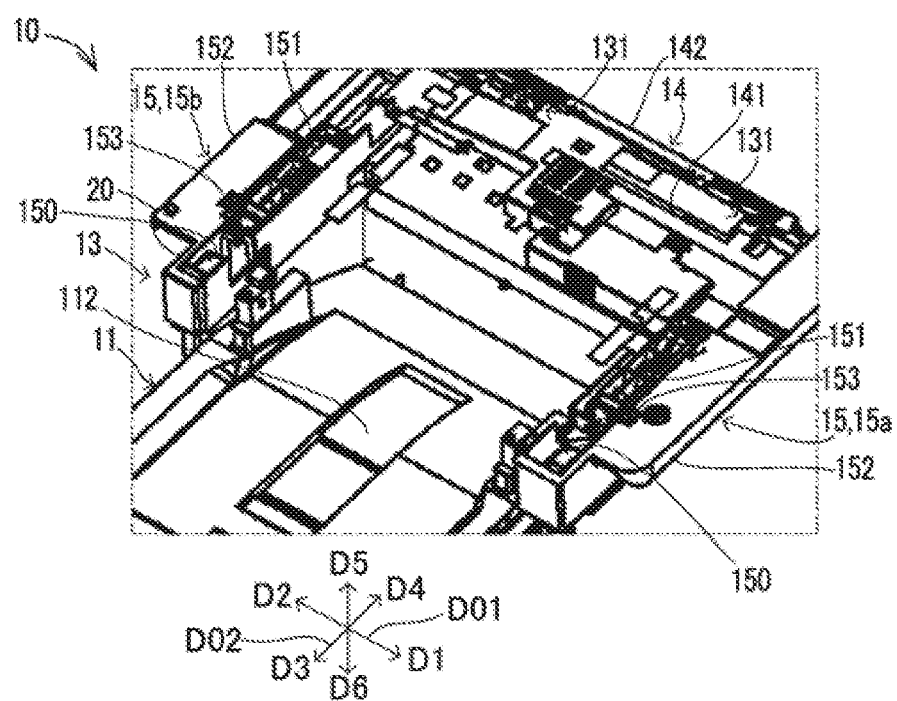
FIG. 2 is a perspective view showing a main unit and a unit coupling part in the image forming apparatus according to the embodiment.

The rear side coupling part 14 contains a rear side frame 141 made of metal, and a rear side exterior member 142 made of resin and fixed to the rear side frame 141 (refer to FIG. 2). In the same manner, each of the lateral side coupling parts 15 contains a lateral side frame 151 made of metal, and a lateral side exterior member 152 made of resin and fixed to the lateral side frame 151 (refer to FIG. 2, FIG. 7 and FIG. 8).

In each figure, a right direction D1, a left direction D2, a front direction D3, a rear direction D4, an upper direction D5 and a lower direction D6 are shown by the arrows. The right direction D1 and the left direction D2 are along the width direction D01.

Hereinafter, one of the lateral side coupling parts 15 is called a first lateral side coupling part 15a, and the other is called a second lateral side coupling part 15b. In the embodiment shown in FIG. 1, of the lateral side coupling parts 15, the right side one is the first lateral side coupling part 15a and the left side one is the second lateral side coupling part 15b when the image forming apparatus 10 is shown from the front side.

The image reading device 16 includes a document reading unit 17 which reads an image of the placed document and a document cover 18 which covers the document on the document reading unit 17. In the present embodiment, the document cover 18 includes an automatic document conveyance device 18a which conveys the document one by one automatically.

Figure 6:
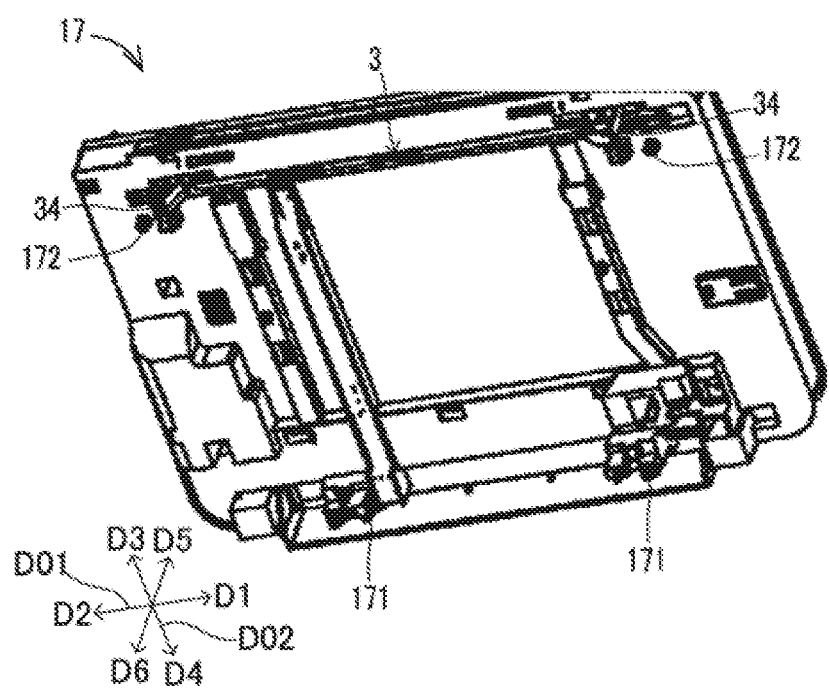
FIG. 6 is a perspective view showing a document cover in the image forming apparatus according to the embodiment.

The document reading unit 17 is coupled to the upper portion of the unit coupling part 13 in an openable and closable manner. As shown in FIG. 2, the document reading unit 17 is supported by the upper portion of the unit coupling part 13 with hinges 131 provided in the rear side coupling part 14 in an openable and closable manner (refer to FIG. 2). As shown in FIG. 6, the document reading unit 17 has hinge coupling parts 171 to be coupled to the hinges 131.

[The lock mechanism 2] Further, the image forming apparatus 10 includes a lock mechanism 2 which locks the document reading unit 17 in a closing state.

Figure 3:
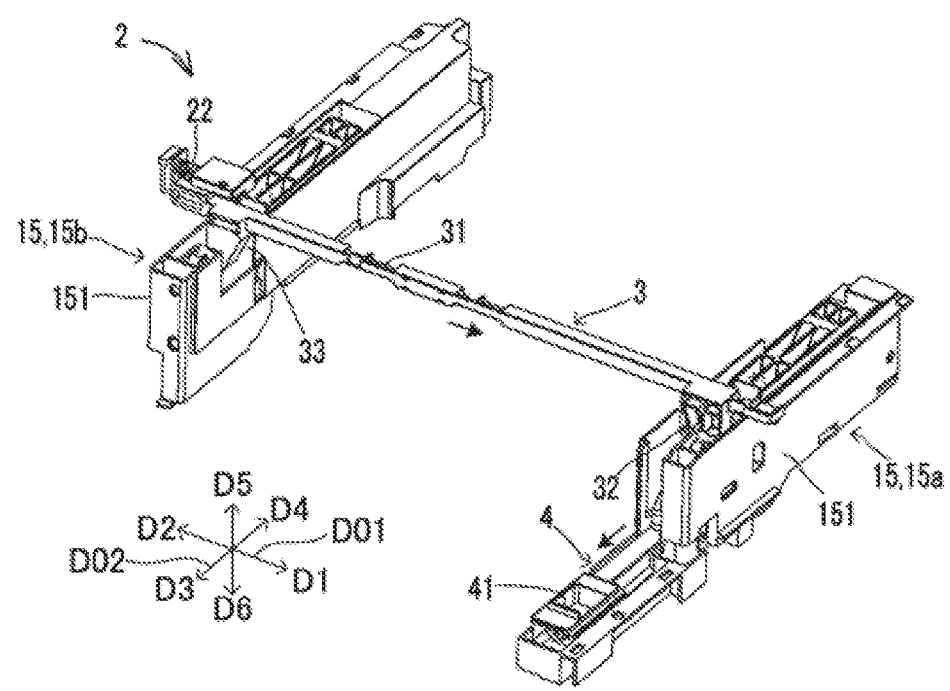
FIG. 3 is a perspective view showing a pair of lateral side coupling parts and a transverse slide member, in the image forming apparatus according to the embodiment.
Figure 4:
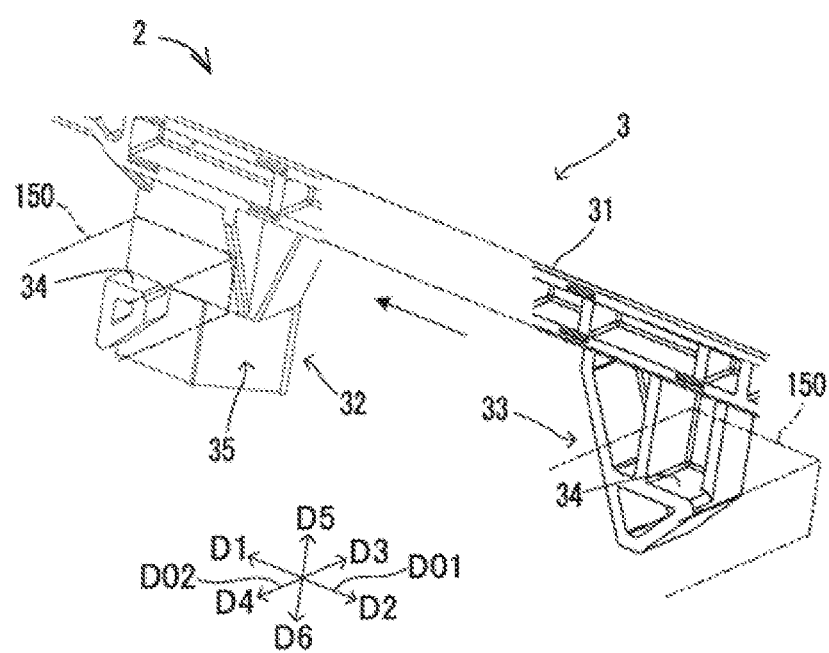
FIG. 4 is a perspective view showing a pair of extension parts of the transverse slide member of the lock mechanism, in the image forming apparatus according to the embodiment.
Figure 5:
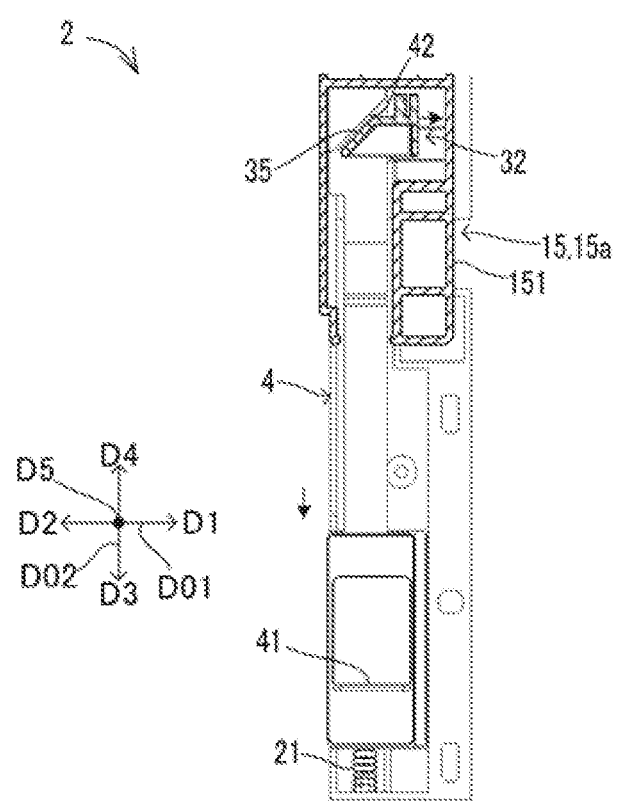
FIG. 5 is a partially sectional plan view showing a part of the transverse slide member and an operation member of the lock mechanism, in the image forming apparatus according to the embodiment.

The lock mechanism 2 includes an operation member 4 shown in FIG. 3 and FIG. 5, and a transverse slide member 3 shown in FIG. 3 and FIG. 4. The lock mechanism 2 further includes a plurality of springs 21 and 22.

The operation member 4 is provided in one of the lateral side coupling parts 15. In the present embodiment, the operation member 4 is provided in the first lateral side coupling part 15a. The operation member 4 is supported so as to be displaceable when operated by an operator.

In the present embodiment, the operation member 4 is supported so as to be displaceable between an initial position and a pull-out position on the front of the initial position along the front-and-rear direction D02 of the main unit 11. On the end portion of the operation member 4 in the front direction D3, a grip 41 operated by a hand directly is formed.

FIG. 5 shows a state where the operation member 4 is positioned in the initial position. The operation member 4 is biased in the rear direction D4 by a spring 21 provided in the first lateral side coupling part 15a. The spring 21 elastically biases the operation member 4 and hold it in the initial position.

As shown in FIG. 3, the transverse slide member is provided in the document reading unit 17, and extends along a range between the lateral side coupling parts 15. The transverse slide member 3 has a transverse rod part 31 and a pair of lower extension parts 32 and 33.

The transverse rod part 31 is formed along the range between the lateral side coupling parts 15 along the width direction D01. The pair of lower extension parts 32 and 33 extend downward from the upper portions of the transverse rod part 31 above the pair of lateral coupling parts 15.

The pair of lower extension parts 32 and 33 contains the first lower extension part 32 extending from the transverse rod part 31 toward the first lateral side coupling part 15a and the second lower extension part 33 extending from the transverse rod part 31 toward the second lateral coupling part 15b.

Each of the first lower extension part 32 and the second lower extension part 33 has a unit engaged part 34 (refer to FIG. 4). That is, the transverse slide member 3 has a pair of the unit engaged parts 34. The pair of unit engaged parts 34 is formed integrally with the transverse rod part 31. Further, a pair of main body engaging parts 150 is formed in the pair of lateral coupling parts 15.

The pair of unit engaged parts 34 is engaged with the pair of main body engaging part 150 to be restricted from being displaced upward. That is, by engaging the pair of unit engaged parts 34 with the main body engaging parts 150, the transverse slide member 3 is restricted from being displaced upward. Then, the document reading unit 17 is locked in the closing state.

The transverse slide member 3 is supported so as to be displaceable along the width direction D01 between a lateral reference position and a lateral releasing position as the operation member 4 is displaced. When the transverse slide member 3 is in the lateral reference position, the pair of unit engaged parts 34 is engaged with the pair of main body engaging parts 150. The lateral reference position is an example of an engaging position. The lateral releasing position is an example of an releasing position.

As shown in FIG. 5, the operation member 4 has a first tapered portion 35, and the first lower extension part 32 of the transverse slide member 3 has a second tapered portion 42. The second tapered portion 42 comes into contact with the first tapered portion 35.

When the operation member 4 is displaced from the initial position in the front direction D3, the first tapered portion 35 applies a pressing force along the width direction D01 to the second tapered portion 42 while slid along the second tapered portion 42. The pressing force is applied along a direction from the lateral reference position toward the lateral releasing position. In the present embodiment, the direction from the lateral reference position toward the lateral releasing position is the right direction D1.

When the second tapered portion 42 is applied with the pressing force from the first tapered portion 35, the transverse slide member 3 is displaced from the lateral reference position to the lateral releasing position. That is, when the transverse slide member 3 is applied with a force along the width direction from the operation member 4 as the operation member 4 is displaced, the pair of unit engaged parts 34 is displaced between the engaging position and the releasing position along the width direction D01.

Specifically, when the operation member 4 is pulled out in the front direction D3 against a biasing force of the spring 21, the operation member 4 is displaced from the initial position to the pull-out position. At this time, by the action of the first tapered portion 35 and the second tapered portion 42, the transverse slide member 3 is displaced from the lateral reference position to the lateral releasing position in cooperation with the operation member 4.

In the present embodiment, an operation to pull the operation member 4 out in the front direction D3 corresponds to a lock releasing operation to release the lock of the document reading unit 17 which is in the closing position. In general, an operation to pull the operation member 4 out in the front direction D3 applies a higher force to the operation member 4 than an operation to push the operation member 4 in the rear direction D4.

The spring 22 is provided in the document reading unit 17 (refer to FIG. 3). The spring 22 elastically biases the transverse slide member 3 and holds it in the lateral reference position. That is, the spring 22 elastically biases the transverse slide member 3 in a direction from the lateral releasing position to the lateral reference position.

On the other hand, when the operation member 4 is displaced from the pull-out position to the initial position, the transverse slide member 3 is returned from the lateral releasing position to the lateral reference position with the elastic biasing force applied from the spring 22.

FIG. 4 shows a state where the transverse slide member 3 is in the lateral reference position and the pair of unit engaged parts 34 is engaged with the pair of main body engaging parts 150. For convenience of explanation, the pair of main body engaging parts 150 is shown by the imaginary line (the two-dotted chain line) in FIG. 4.

When the transverse slide member 3 is in the lateral releasing position, the engagement of the pair of unit engaged parts 34 with the pair of main body engaging parts 150 is released.

By the way, the rear end portions of the lateral side coupling parts 15 are coupled to the rear side coupling part 14 and then reinforced. Then, the rear end portions of the lateral side coupling parts 15 are held in the original suitable position even if the document reading unit 17 is in the opening position.

On the other hand, near the front upper portions of the lateral side coupling parts 15, there are no member to be coupled for reinforcement. Then, in a state where the document reading unit 17 is in the opening position, the front upper portions of the lateral side coupling parts 15 may be displaced inward or outward from the original suitable position.

Especially, when the lock mechanism 2 including the transverse slide member 3 is applied, each of the lateral side coupling parts 15 is applied with a force along the width direction D01 in response to the operation for the operation member 4. Then, the first lateral side coupling part 15a provided with the operation member 4 may be displaced in the width direction D01 by the force applied from the operation member 4.

When the pair of lateral side coupling parts 15 is displaced, the following disadvantages occur, for example.

One of the disadvantages is that the main body engaging part 150 and the unit engaged part 34 which form the lock mechanism 2 locking the document reading unit 17 in the closing position are displaced. In this case, the lock mechanism 2 may not function normally. The main body engaging part 150 is provided in the lateral side coupling part 15, and is engaged with the unit engaged part 34 of the transverse slide member 3 provided in the document reading unit 17.

The other of the disadvantages is that the lateral side face 15x of each of the lateral side coupling parts 15 may be displaced from the original position with respect to the lateral side face 17x of the document reading unit 17, and deteriorates the appearance of the image forming apparatus 10. The lateral side face 15x of the lateral side coupling part 15 and the lateral side face 17x of the document reading unit 17 are shown in FIG. 1 and FIG. 8 to FIG. 10.

Figure 8:
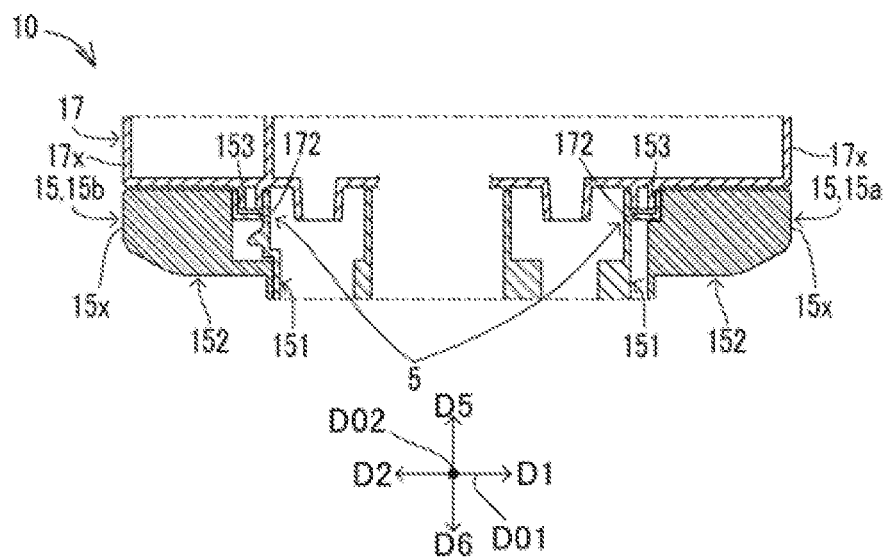
FIG. 8 is a sectional view showing the coupling part and a part of the image reading unit (a state where the convex part is fitted into the concave part) in the image forming apparatus according to the embodiment.
Figure 9:
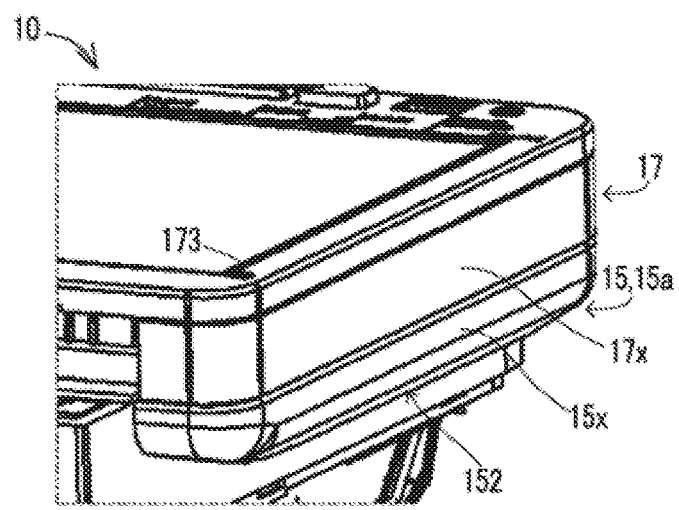
FIG. 9 is a perspective view showing the right side faces of the main unit and the lateral side coupling part in the image forming apparatus according to the embodiment.
Figure 10:
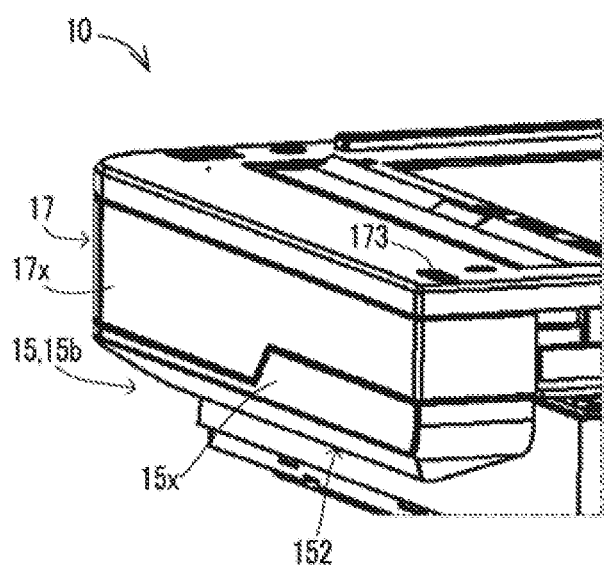
FIG. 10 is a perspective view showing the left side faces of the main unit and the lateral side coupling part in the image forming apparatus according to the embodiment.

In the example shown in FIG. 8 to FIG. 10, the lateral side face 15x of each of the lateral side coupling parts 15 is formed on the same plane as the lateral side face 17x of the document reading unit 17. The exterior shape is the original exterior shape of the image forming apparatus 10. In this case, a level difference may be formed between the lateral side face 15x of each of the lateral side coupling parts 15 and the lateral side face 17x of the document reading unit 17. Such level difference may deteriorate the appearance of the image forming apparatus 10.

Figure 7:
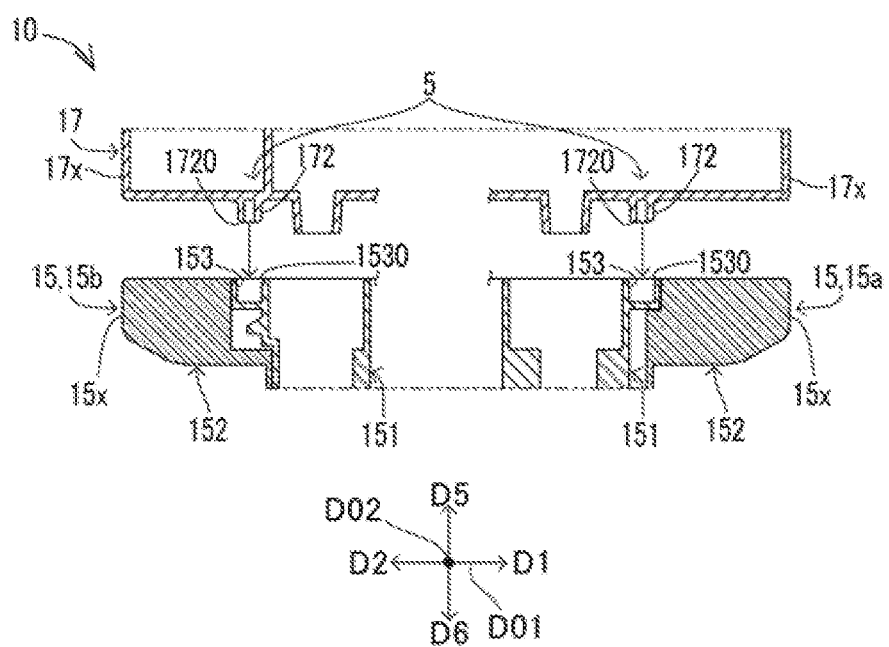
FIG. 7 is a sectional view showing a coupling part and a part of the image reading unit (a state before a convex portion is fitted into a concave part) in the image forming apparatus according to the embodiment.

The image forming apparatus 10 includes a correction mechanism 5 which avoids the displacement of the position of the lateral side coupling parts 15 in the unit coupling part 13 which couples the main unit 11 to the document reading unit 17, with respect to the position of the document reading unit 17 (refer to FIG. 7 and FIG. 8).

[The correction mechanism 5] Hereinafter, the correction mechanism 5 will be described. The correction mechanism 5 is a mechanism which corrects the position of the pair of lateral side coupling parts 15 with respect to the document reading unit 17 in the width direction D01 by closing the document reading unit 17.

The correction mechanism 5 includes a pair of concave parts 153 and a pair of convex parts 172 (refer to FIG. 2, FIG. 6 to FIG. 8). The pair of concave parts 153 are formed on the upper faces of the portions close to the front end portions of the pair of lateral side coupling parts 15 (refer to FIG. 2). The pair of convex parts 172 are formed on the lower faces of the portions close to the front end portions of the document reading unit 17 (refer to FIG. 6).

In the embodiment shown in FIG. 7 and FIG. 8, the pair of concave parts 153 are formed in the lateral frames 151 of the pair of lateral side coupling parts 15.

The pair of convex parts 172 are fitted into the pair of concave parts 153 as the document reading unit 17 is closed. FIG. 7 shows a state just before the document reading unit 17 is closed, and FIG. 8 shows a state where the document reading unit 17 is closed.

When the document reading unit 17 is opened, one or both the lateral side coupling parts 15 may be inclined inward or outward with respect to the original position. Even in such a case, by fitting the pair of convex parts 172 into the pair of concave parts 153 as the document reading unit 17 closed, the position of the pair of lateral side coupling parts 15 with respect to the document reading unit 17 is corrected in the width direction D01.

Further, as shown in FIG. 2, the pair of concave parts 153 provided in the pair of lateral side coupling parts 15 are provided closer to the rear side coupling part 14 than the main body engaging part 150. Then, when the document reading unit 17 is closed, before the pair of the unit engaged parts 34 reaches near the pair of main body engaging part 150, the pair of convex parts 172 is fitted into the pair of concave parts 153.

That is, when the document reading unit 17 is closed, after the position of the pair of lateral side coupling parts 15 is corrected, the pair of unit engaged parts 34 reaches near the pair of main body engaging parts 150. This prevents the unit engaged part 34 from being met against a part of the displaced lateral side coupling part 15 from the upper side.

The inner circumferential face of the opening of each concave part 153 is formed to be an inclined face 1530 which guides the tip end portion of each convex part 172 to the concave part 153. The outer circumferential face of the tip end portion of each convex part 172 is formed to a tapered face 1720. Then, each convex part 172 is smoothly fitted into each concave part 153.

Further, as described above, the lateral side faces 15x of the pair of lateral side coupling parts 15 are formed so as to be the same plane as the lateral side faces 17x of the document reading unit 17 (refer to FIG. 8 to FIG. 10). The exterior shape contributes to improving the appearance of the image forming apparatus 10.

The correction mechanism 5 prevents the deterioration in the appearance of the lateral side faces of the image forming apparatus 10 owing to the displacement of the lateral side coupling parts 15. The lateral side face 15x of the lateral side coupling part 15 is the lateral side face of the lateral side exterior member 152 of the lateral side coupling part 15.

[First modified example] The pair of concave parts 153 may be formed on the lower face of the portion close to the front end portion of the document reading unit 17. In this case, the pair of convex parts 172 may be formed on the upper face of the portion close to the front end portions of the pair of lateral side coupling parts 15.

[Second modified example] One of the concave parts 153 may be formed on the upper face of the portion close to the front end portion of one of the lateral side coupling parts 15 while the other of the concave parts 153 may be formed on the lower face of the portion close to the front end portion of the document reading unit 17. In this case, one of the convex parts 172 may be formed on the lower face of the portion close to the front end portion of the document reading unit 17 while the other of the convex parts 172 may be formed on the upper face of the portion close to the front end portion of the other of the lateral side coupling parts 15.

While the embodiments of the present disclosure have been described, the embodiments are shown by way of example and are not intended to limit the scope of the disclosure.

The invention claimed is:

1. An image forming apparatus comprising:
   a main unit having a discharge tray on which a sheet having an image is stacked, on an upper face;
   a unit coupling part including a rear side coupling part protruded on the upper face of the main unit on a rear side of the discharge tray, and a pair of lateral side coupling parts protruded on the upper face of the main unit on lateral sides of the discharge tray and whose rear end portions are coupled to the rear side coupling part;
   a document reading unit supported by an upper portion of the unit coupling part with a hinge provided in the rear side coupling part in an openable and closable manner; and
   a correction mechanism which corrects a position of the pair of lateral side coupling parts with respect to the document reading unit in a facing direction where the lateral side coupling parts face each other, by closing the document reading unit, wherein
   the correction mechanism includes:
   a pair of concave parts provided in one of upper faces of portions close to front end portions of the lateral side coupling parts and a lower face of a portion close to a front end portion of the document reading unit; and
   a pair of convex parts provided in the other of the upper faces of the portions close to the front end portions of the lateral side coupling parts and the lower face of the portion close to the front end portion of the document reading unit, and fitted into the pair of concave parts when the document reading unit is closed.

2. The image forming apparatus according to claim 1, further comprising a lock mechanism which locks the document reading unit in a closing position, wherein
   the lock mechanism includes:
   a pair of engaging parts provided in the pair of lateral side coupling parts; and
   a pair of engaged parts provided in the document reading unit and engaged with the pair of engaging parts in a state where the document reading unit is closed, thereby restricting upward displacement, wherein
   the pair of concave parts or the pair of convex parts provided in the pair of lateral side coupling parts, of the pair of concave parts and the pair of convex parts, is provided on a side closer to the rear side coupling part than the pair of engaged parts.

3. The image forming apparatus according to claim 2, further comprising:
   an operation member provided in one of the lateral side coupling parts and displaceable operated by an operator; and
   a transverse slide member provided in the document reading unit in a displaceable manner in the facing direction, and having a transverse rod part, extending along a range between the lateral side coupling parts, and the pair of engaged parts formed integrally with the transverse rod part, wherein
   when the transverse slide member is applied with a force along the facing direction from the operation member as the operation member is displaced, the transverse slide member is displaced between an engaging position where the pair of engaging parts are engaged with the pair of engaged parts and a releasing position where the pair of engaging parts is disengaged from the pair of engaged parts.

4. The image forming apparatus according to claim 3, wherein the operation member is displaceable in a front-and-rear direction perpendicular to the facing direction, and by displacing the operation member in a front side, the transverse slide member is displaced from the engaging position to the releasing position.

5. The image forming apparatus according to claim 1, wherein lateral side faces of the pair of lateral side coupling parts are formed on the same plane as lateral side faces of the document reading unit.

6. The image forming apparatus according to claim 1, wherein each of the lateral side coupling parts has a lateral side frame made of metal and a lateral exterior member made of resin and fixed to the lateral side frame, and a lateral side face of the lateral exterior member is formed on the same plane as the lateral side face of the document reading unit.

* * * * *